Figure 3:
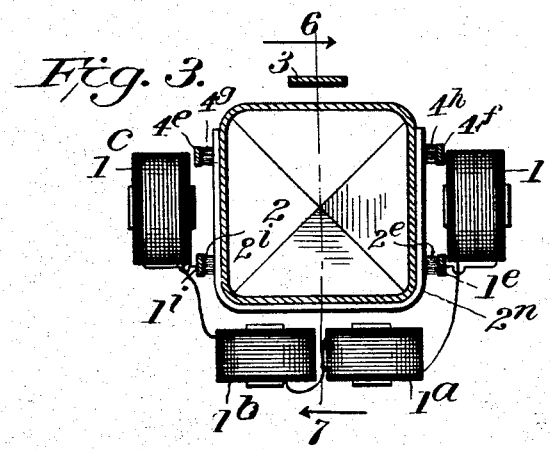

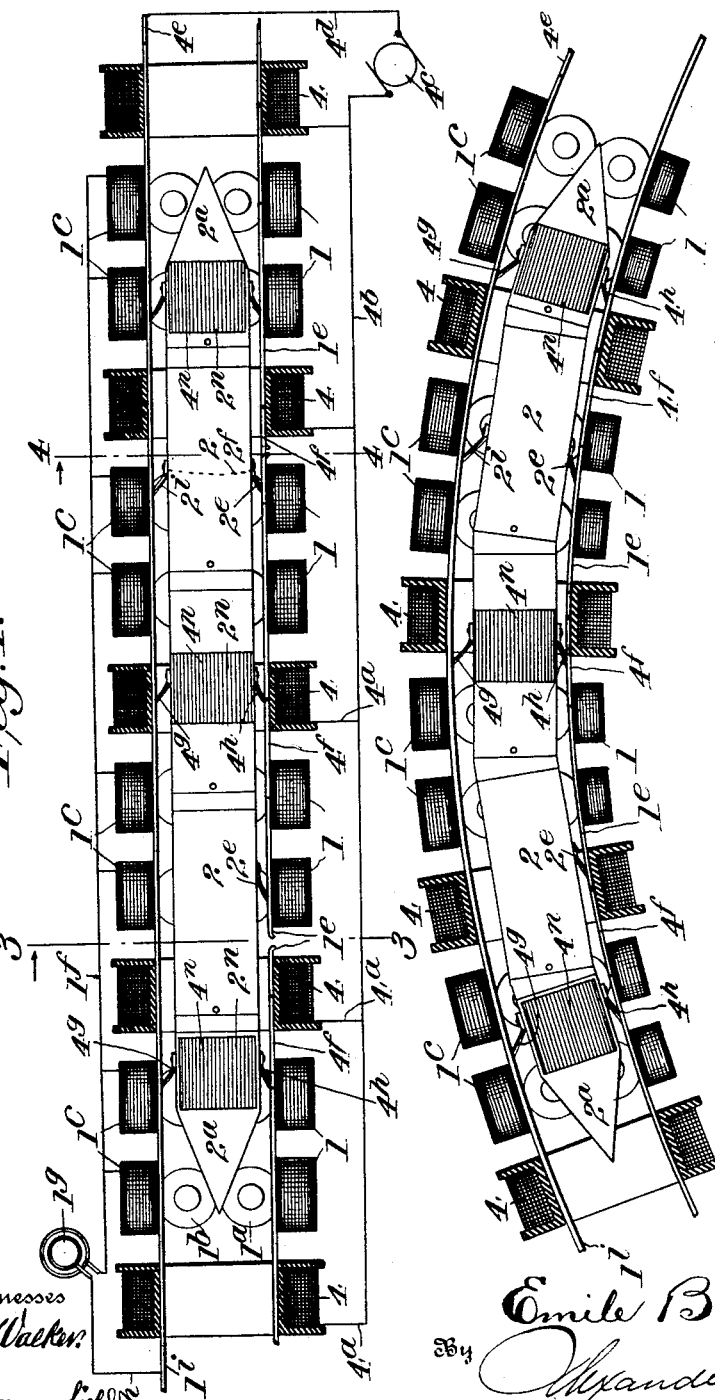

E. BACHELET.
LEVITATING TRANSMITTING APPARATUS.
APPLICATION FILED APR. 2, 1910. RENEWED JUNE 12, 1911.

1,020,942.

Patented Mar. 19, 1912.

3 SHEETS—SHEET 2.

E. BACHELET.
LEVITATING TRANSMITTING APPARATUS.
APPLICATION FILED APR. 2, 1910. RENEWED JUNE 12, 1911.
1,020,942.
Patented Mar. 19, 1912.
3 SHEETS—SHEET 3.
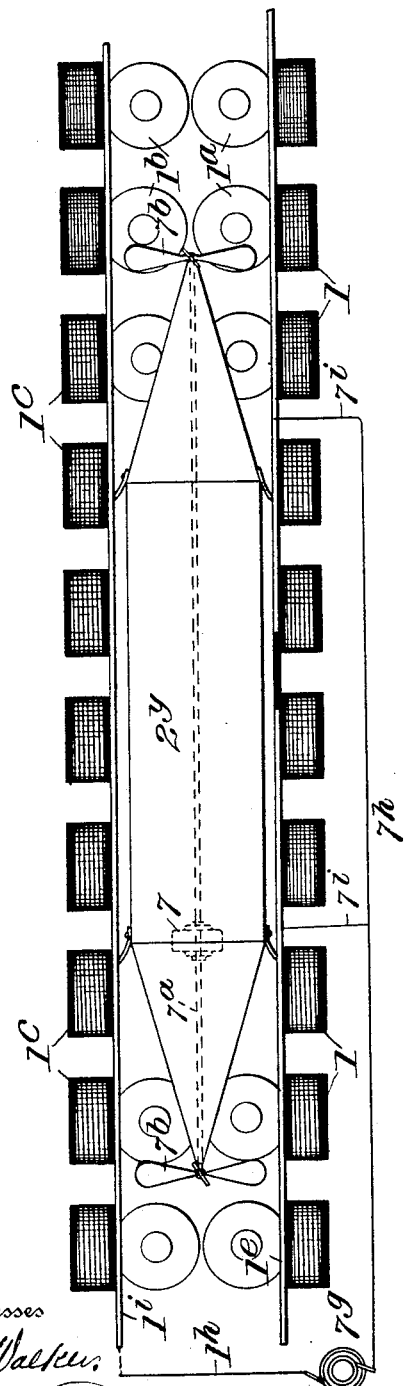
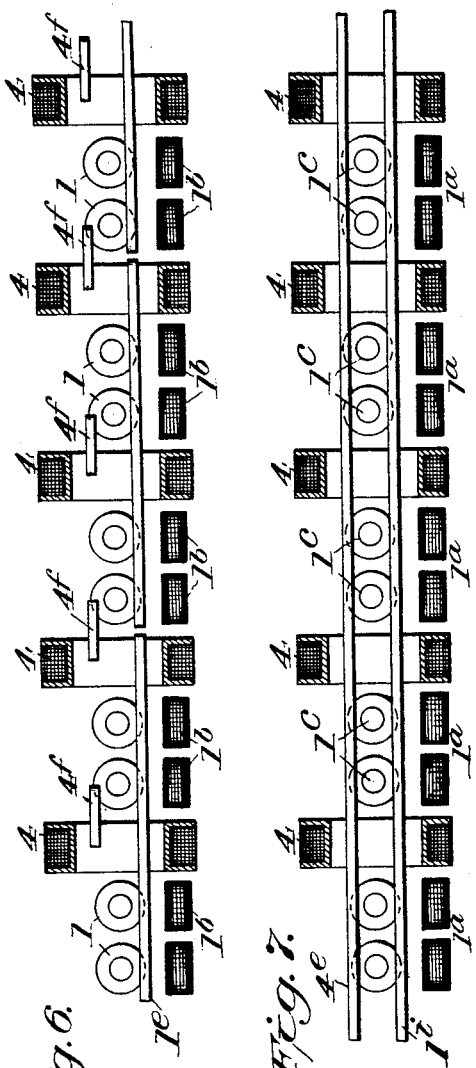
Inventor
Emile Bachelet.
Witnesses

UNITED STATES PATENT OFFICE.

EMILE BACHELET, OF MOUNT VERNON, NEW YORK.

LEVITATING TRANSMITTING APPARATUS.

1,020,942. Specification of Letters Patent. Patented Mar. 19, 1912.

Application filed April 2, 1910, Serial No. 553,134. Renewed June 12, 1911. Serial No. 632,771.

*To all whom it may concern:*

Be it known that I, EMILE BACHELET, of Mount Vernon, in the county of Westchester and State of New York, have invented certain new and useful Improvements in Levitating Transmitting Apparatus; and I hereby declare that the following is a full, clear, and exact description thereof, reference being had to the accompanying drawings, which form part of this specification.

This invention is a novel apparatus for transferring bodies at very high speed from one point to another,—and is particularly designed and adapted for transmitting mail and small express packages long distances at very high speed; but may be adapted for local use, such as transmitting mail or express packages from one local station to another, or for moving cash and parcel carriers in large department stores; and it also may be adapted, in very large apparatus, for the transport of freight, or passengers.

The primary object of the invention is to obviate friction between moving parts, and to provide a practically frictionless carrier which will have no rubbing or rolling friction on the ways but is floated or levitated in a magnetic field, which field can be maintained around such body, and may be extended indefinitely, so that by properly constructing the apparatus such body can be caused to traverse such a field while levitated thus doing away with any rubbing friction or contact and enabling me to dispense with slides and wheels for supporting the carrier while in transit, the only friction to overcome being that of the air through which the carrier moves.

The means by which the magnetic field is established for levitating or floating the carrier can also be arranged to form a guide-way for the carrier, and the carrier may be caused to move along this guideway by electro-magnetic forces, which can be practically produced by an arrangement of solenoids along the path of the carrier, by which the carrier is propelled or drawn through the magnetic field with great rapidity and without any direct application of mechanical force thereto. The invention however is not restricted to the employment of electro-magnetic force for impelling the carrier, as it could be propelled by creating a vacuum in front of the carrier in a properly constructed apparatus, or by applying compressed air behind, or by other suitable means. I prefer to employ electro-magnetism both for the purpose of levitating the carrier and also for the purpose of propelling it while levitated.

I will now describe the invention with reference to the accompanying drawings which form part of the specification and which conventionally illustrate an apparatus in which the invention might be embodied and which will suffice to enable those skilled in the art to utilize the invention in practice.

Figure 4:
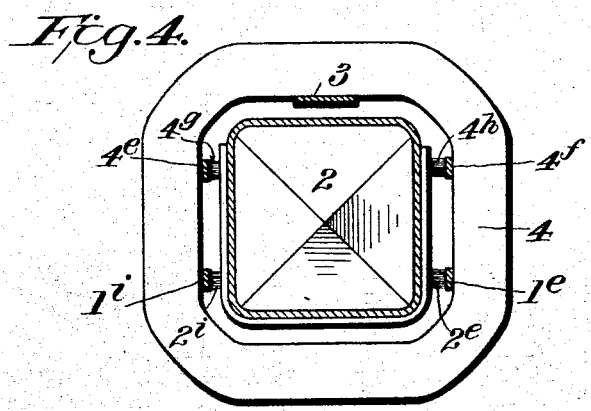
Figure 5:
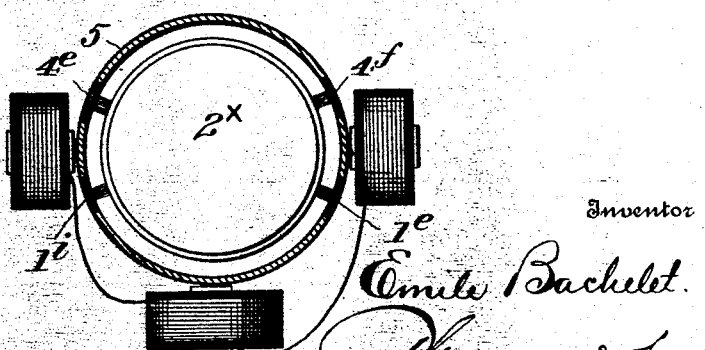

In said drawings—Figure 1 is a plan view partly in section of a portion of an apparatus showing the carrier, an arrangement of magnets for producing a magnetic field to levitate or float the carrier, and an arrangement of solenoids for impelling the carrier. Fig. 2 is a view similar to Fig. 1 showing how the apparatus may be arranged to deflect the path of the carrier. Fig. 3 is an enlarged transverse section on line 3—3, Fig. 1. Fig. 4 is a similar section on line 4—4, Fig. 1. Fig. 5 is a transverse sectional view illustrating a modification of the construction. Fig. 6 is a sectional view on line 6—7 Fig. 3, illustrating the arrangement of some of the contacts. Fig. 7 is a similar opposite section on line 6—7 Fig. 3. Fig. 8 is a sectional view of a modification in which the carrier is propelled by a self-contained motor.

As shown in the drawings a magnetic-field or pathway is provided for the reception and direction of the carrier; this magnetic-field is preferably formed by transverse and longitudinal series of magnets arranged along the path to be traversed by the carrier. As shown in Figs. 1, 2, 3, each transverse series of magnets contains opposite side magnets 1, $1^c$, and preferably a pair of bottom magnets $1^a$, $1^b$; the magnets are preferably electro-magnets and are arranged with their poles alternating,—that is, the magnet 1 has its N. pole innermost and the magnet $1^a$ has its S. pole innermost, and the magnet $1^b$ its N. pole innermost, and the magnet $1^c$ has its S. pole innermost; and theses magnets are preferably connected in series by means of wires as shown in Fig. 3,—the first coil of magnet 1 being connected to a conductor $1^e$ and the last coil in each magnet $1^c$ being connected to a conductor $1^f$, which is preferably connected with a source of alternating electricity as shown at $1^g$ Fig. 1. The magnets 1, $1^a$, $1^b$, $1^c$, may be energized by any periodic current—such as an interrupted direct current—or an alternating current; which can also be interrupted if desired. The other terminal of the generator $1^g$ may be connected by a wire $1^h$ with a conductor $1^i$ which extends along the path of the carrier—hereinafter referred to. And said carrier is provided with devices for closing the circuit between the conductors $1^e$ and $1^i$ whereby the series of magnets $1^a$, $1^b$, $1^c$, will be energized. Conductors $1^e$ may be extended and connected with several adjacent and alined magnets 1 as shown in Fig. 1 so that when the current is closed between the conductors $1^e$ and $1^i$ all the connected magnets will be simultaneously energized in multiple. I preferably so arrange these conductors $1^e$ that the magnets will be energized in advance of the carrier and cut out of circuit after the latter passes so that it is not necessary to keep all the levitating magnets energized,—thus greatly economizing the amount of current required to operate the apparatus.

The carrier 2 is preferably made in the form of a hollow body of greater length than diameter and as shown may be made in pivotally connected sections and may have conical ends $2^a$ to lessen the air resistance. This carrier is of less diameter than the distance between the poles of the opposed magnets 1, $1^c$, and it is preferably made of a very light conductive material, such as pure aluminum. But the aluminum body should be of sufficient thickness to resist or greatly retard the flow of magnetic lines of force therethrough so that the carrier will be repelled from the magnets, such repulsion probably being due to the reaction of the induced eddy currents in the material of the carrier upon the field producing them. When such a body is placed in the trough-like space formed by the magnets $1^a$, $1^b$, $1^c$, as shown in Fig. 3, and the magnets are energized, it will be repelled from the magnets and levitated out of contact with all the magnets and actually remain suspended in the air, floating in the magnetic-field produced by the magnets. It is practically repelled from all the magnets as indicated in Fig. 3 and will remain suspended, and if the parts are properly proportioned the carrier may be loaded, according to its size and strength of the magnetic-field, with matter to be transported.

As shown the carrier 2 is provided with a brush $2^i$ adapted to contact with the conductor $1^i$ and with one or more brushes $2^e$ adapted to contact with the conductors $1^e$, and the brushes $2^e$ and $2^i$ are electrically connected as by wires $2^f$ indicated in Figs. 1 and 2, so that as the carrier is advanced along the passage or guide-way formed by the series of magnets the magnets in advance are energized from the generator $1^g$ while the magnets in the rear of the carrier will be cut out of circuit. In this way a shifting magnetic field is formed around and moving with the carrier, no matter how fast the latter may travel; and it is obvious that by properly extending the series of levitating magnets the carrier may be levitated from one end of the line to the other and while so levitated there is no friction to overcome in its moving from one end of the line to the other except the slight friction of the brushes against the conductors and the skin friction of the air against the surface of the carrier.

The levitating action of the magnets upon the car may be increased by arranging above the path of the car, and out of contact therewith, a guard 3 which is extended along and over the path of the carrier and serves the double purpose of preventing the carrier accidentally flying out of its path, the magnetic-field, if the path or field should be deflected in a vertical plane,—and when said guard is made of metal, I find it has some induced magnetism which can be utilized as an attractive force to help levitate the car by providing the car with sheet iron rings or plates $2^n$ as indicated in Fig. 3. I do not however consider the invention restricted to the employment of such guard nor to having it made of metal as above described. The levitated car may be propelled or impelled through this magnetic field by any suitable means, but I prefer to employ solenoids as hereinafter described.

As shown in the drawings at intervals along the pathway of the carrier I arrange solenoids 4 which are arranged to entirely surround the path of the carrier 2, and are placed at such distances apart, and energized in succession in such manner and time, that they will draw or impel the carrier to traverse along the magnetic field while levitated therein. As shown in Fig. 1 one terminal of each solenoid 4 is connected by a wire $4^a$ to a conductor $4^b$ which is connected with one pole of a source of electricity, preferably a direct current generator $4^c$. The other pole of this generator is connected by a wire $4^d$ to a conductor $4^e$ that extends along the path traversed by the carrier. The other terminal of each solenoid is connected to an adjacent contact bar $4^f$ and such solenoids are energized when the electric circuit is closed between the bar $4^f$ and conductor $4^e$. Such circuit is closed at the proper time by brushes on the carrier. As shown the carrier has a brush $4^g$ adapted to contact with the conductor $4^e$ and a brush $4^h$ adapted to contact with the plates $4^f$. The brushes $4^g$ and $4^h$ are electrically connected as by a soft iron band $4^n$ on the carrier as shown; and this band $4^n$ is also adapted to act as a core and when the solenoids are energized, will be attracted by the solenoids in a well known manner; and the bars $4^f$ are so arranged that the circuit will be closed through a solenoid just in advance of the core $4^n$ and will be cut off when such core has properly entered the solenoid, so that the solenoid only tends to impel the carrier forward and not to retard it, in the portion of the apparatus intermediate the receiving stations. Preferably the carrier is provided with a plurality of these cores $4^n$. As indicated in the drawings there are three of such cores each provided with brushes $4^h$, $4^g$, and they are so arranged and distanced apart that the cores are successively acted upon by each solenoid and there will always be at least one solenoid acting to impel the carrier forward, the solenoids being successively energized along the pathway of the carrier as the latter traverses the same. It is obvious that by reason of the levitation of the carrier, or its floating without frictional contact in the passageway, it can be traversed through the magnetic-field at very high velocity all mechanical friction being obviated and there is nothing except the skin friction to oppose the movement of the carrier through the magnetic field, so it can be made to traverse a great length of such field with utmost velocity with a very slight expenditure of power in energizing the solenoids and magnets,—the solenoids being energized sufficiently in advance of the carrier as is required to impel the same, and being cut out after the carrier passes, and the levitation magnets also being energized only for very short periods.

As indicated in Figs. 3 and 4 the cores $2^n$ may be in the form of soft sheet iron bands inserted within the carrier sections at the proper points, but preferably the upper part of said bands project outside of the carrier, opposite the guard 3, so that the induced magnetism in the guard will assist in levitating the carrier.

As indicated in Fig. 5 the magnetic-field might be established within a closed tube 5, around which the magnets are placed as shown and energized by periodic currents so as to levitate the carrier $2^x$ as above described; and such levitated carrier $2^x$ could be propelled through this tube by exhausting air in front of it, or admitting compressed air behind it. Of course such a tube might also be used in connection with the magnetic-field and solenoids in Fig. 1. In order to enable the carrier, if very long, to traverse curves, it may be made in jointed sections, as indicated in Fig. 2 of the drawings. In some cases the carrier might carry its own motor, and as indicated in Fig. 8, an electric motor 7 is connected to a shaft $7^a$ in the carrier $2^y$ which carries on its ends propellers $7^d$ which are adapted to move the levitated carrier $2^y$ along the magnetic-field when the motor is running. I however now prefer to use solenoids for impelling the carrier along the way. When no solenoids are used, as in Fig. 8, the conductor $1^i$ may be connected by a wire $1^h$ to a direct-current generator $7^g$, and the conductor $1^e$ may be connected by wires $7^i$, $7^h$, to the other pole of such motor.

The carrier can be arrested at the receiving stations by any suitable devices; and its momentum can be checked by cutting out the solenoids for a sufficient distance in advance of the terminal station,— or for more quickly stopping the carrier the solenoids might be so energized as to detain the carrier instead of impelling it.

The particular details of construction are not essentials of the present invention,— the novel characteristic of which is the levitation of the carrier, and the elimination of all mechanical friction, to such an extent at least that it becomes a negligible factor in determining the possible speed of the carrier and of the force required to impel same along its route.

What I claim is:

1. Transmitting apparatus comprising a non-magnetic carrier of conducting material, means for producing a periodic magnetic field to levitate the carrier, and means for moving said carrier while levitated.

2. In transmitting apparatus, the combination of means for establishing a periodic electro-magnetic field, a carrier of non-magnetic metal adapted to levitate when introduced into such field, and means for moving the carrier in said field when levitated.

3. Transmitting apparatus comprising means for producing a lineal periodic electro-magnetic field, a carrier of non-magnetic conducting material adapted to be levitated when introduced into such field, and means for causing such carrier to traverse said field while levitated.

4. Transmitting apparatus, comprising a line of electro-magnets, means for periodically energizing such magnets, a non-magnetic carrier adapted to be levitated when introduced into the magnetic field created by said magnets, and means for causing the carrier to traverse the magnetic field when levitated.

5. Transmitting apparatus, comprising lineally disposed series of electro-magnets, a carrier of non-magnetic conducting material adapted to be levitated when placed in the magnetic-field produced by the magnets, means for periodically energizing the magnets to create a magnetic field around the carrier, and means for impelling the carrier along the series when levitated.

6. In a transmitting apparatus, the combination of parallel rows of electro-magnets, a carrier of non-magnetic conducting material adapted to be levitated when placed between the rows of the magnets, means for periodically energizing the magnets to create a magnetic field around the carrier as it traverses along the rows, and means for impelling the carrier along the rows when levitated.

7. Transmitting apparatus, comprising series of electro-magnets, a carrier formed of non-magnetic conducting material adapted to be levitated when placed in the magnetic-field produced by said magnets, means for periodically energizing the magnets to produce a magnetic-field around the carrier, and electro-magnetic means for causing the carrier to move along the series of magnets while levitated.

8. In a transmitting apparatus, the combination of lineally arranged rows of electro-magnets, a carrier of non-magnetic conductive material adapted to be levitated when placed in the magnetic-field produced by said magnets, means for successively and periodically energizing the magnets to produce a magnetic-field around the carrier as it traverses the series, and solenoids adapted to impel the carrier along the series of magnets while levitated.

9. In a transmitting apparatus, the combination of lineally arranged series of electro-magnets, an aluminum carrier adapted to be levitated when placed in the magnetic-field produced by said magnets, means for periodically energizing said magnets, and means to impel the aluminum carrier along the series of magnets while levitated.

10. Transmitting apparatus, comprising rows of electro-magnets, an aluminum carrier adapted to be levitated when placed in the magnetic-field produced by said magnets, means for periodically energizing said magnets, and means for causing said carrier to traverse along the rows of electro-magnets.

11. In transmitting apparatus, a guide way, means for establishing a periodic electro-magnetic field at successive points along the guide way, and a carrier adapted to levitate when introduced into such field, and to traverse the guide way.

12. An electro-magnetic levitating apparatus, comprising means for establishing a periodic electro-magnetic field, a carrier having a body formed of non-magnetic conducting material, such as aluminum, whereby the carrier will levitate when introduced into such field, and means for controlling the movement of the carrier.

In testimony that I claim the foregoing as my own, I affix my signature in presence of two witnesses.

EMILE BACHELET.

Witnesses:
C. W. FOWLER,
JAMES R. MANSFIELD.

---

Copies of this patent may be obtained for five cents each, by addressing the "Commissioner of Patents, Washington, D. C."